(12) United States Patent
Feenstra et al.

(10) Patent No.: US 8,154,486 B2
(45) Date of Patent: Apr. 10, 2012

(54) DRIVING OF ELECTROWETTING DISPLAY DEVICE

(75) Inventors: Johannes Bokke Feenstra, Nuenen (NL); Roy Van Dijk, Eindhoven (NL); Robert Hayes, Hong Kong (CN)

(73) Assignee: Samsung LCD Netherlands R&D Center B.V., Eindhoven (NL)

( * ) Notice: Subject to any disclaimer, the term of this patent is extended or adjusted under 35 U.S.C. 154(b) by 166 days.

(21) Appl. No.: 12/593,743

(22) PCT Filed: Mar. 28, 2008

(86) PCT No.: PCT/EP2008/053769
§ 371 (c)(1),
(2), (4) Date: Apr. 19, 2010

(87) PCT Pub. No.: WO2008/119774
PCT Pub. Date: Oct. 9, 2008

(65) Prior Publication Data
US 2010/0231566 A1    Sep. 16, 2010

(30) Foreign Application Priority Data

Mar. 30, 2007 (GB) .................................. 0706275.5

(51) Int. Cl.
*G09G 3/34* (2006.01)
(52) U.S. Cl. ........... 345/84; 345/107; 345/204; 359/245
(58) Field of Classification Search .................... 345/84, 345/94, 107, 204, 211, 212, 214; 359/245, 359/253, 296
See application file for complete search history.

(56) References Cited

FOREIGN PATENT DOCUMENTS

| WO | 03/071346 A1 | 8/2003 |
|---|---|---|
| WO | 03/079323 A1 | 9/2003 |
| WO | 2005/036517 A1 | 4/2005 |
| WO | WO 2005036517 | * 4/2005 |
| WO | 2007/049196 A2 | 5/2007 |
| WO | 2007/057797 A1 | 5/2007 |
| WO | 2008/059038 A1 | 5/2008 |

OTHER PUBLICATIONS

International Search Report for PCT/EP2008/053769, mailed on Jul. 2, 2008.
United Kingdom Search Report for GB0706275.5, date of search Jul. 20, 2007.

* cited by examiner

*Primary Examiner* — Abbas Abdulselam
(74) *Attorney, Agent, or Firm* — BainwoodHuang

(57) ABSTRACT

The invention relates to a method of driving an electrowetting display device including a display element, the display element having an electrode for applying a voltage and providing a display state in response to a signal level of the voltage. The method comprises the following subsequent steps for maintaining a display state of the display element: (1) applying a first signal level ($V_a$) during a first period ($t_1$ $t_2$) for the display state; (2) applying a second signal level (0) during a second period ($t_2$-$t_3$); and (3) applying the first signal level during a third period ($t_3$-$t_4$). The first period is longer than 1 ms and the first period plus the third period is longer than five times the second period.

16 Claims, 3 Drawing Sheets

DRIVING OF ELECTROWETTING DISPLAY DEVICE

FIELD OF THE INVENTION

The invention relates to a method of driving of an electrowetting display device, a display driving system adapted for using the method and an electrowetting display apparatus including a display driving system and a display device.

BACKGROUND OF THE INVENTION

An electrowetting display apparatus is known inter alia from WO2003/071346. This known display apparatus includes an electrowetting display device and a display driving system. The display device has a plurality of display elements, each of which comprises a non conductive first fluid and an immiscible, polar second fluid. A display element has at least two electrodes, one of which may be in common with a plurality of display elements. When no voltage is applied to the electrodes the element is in an inactive state and the two fluids form two layers, both extending over the cross-section of the display element. On application of a voltage the element is in an active state and the first fluid is contracted and does not cover the entire cross-section of the display element anymore. When the first fluid is fully retracted, the element is in an open state. Depending on the optical properties of the first and second fluid, a display effect can be achieved for incident light that it is reflected or transmitted by the display element. The combined display effects of a plurality of elements in the display device produces an image for an observer.

A method of driving an electrowetting display device containing such display elements is known from WO2005/036517. The method uses the application of voltages to the elements which cause only a partial contraction of the first fluid, thereby producing grey level display states. The stability of the grey level display states is improved by applying a so-called pre-pulse before applying the signal level for the desired display state to the element. The pre-pulse sets the element in an initial state, thereby erasing a memory of previous display states of the element.

A disadvantage of the known method of driving is the inadequate quality of the image.

It is an object of the invention to provide a method of driving that improves the quality of the image.

SUMMARY OF THE INVENTION

The object is achieved by a method of driving an electrowetting display device including a display element, the display element having an electrode for applying a voltage and providing a display state in response to a signal level of the voltage, the method comprising the following subsequent steps for maintaining a display state of the display element:
applying a first signal level during a first period for providing the display state;
applying a second signal level different from the first signal level during a second period while substantially maintaining a perceived display state of the first period; and
applying the first signal level during a third period;
the first period being longer than 1 ms and the sum of the first period and the third period being longer than five times the second period.

The invention is based on the insight that the inadequate performance of the prior art display device is due to lack of stability of the display state during a display period, i.e. the period during which the desired, first display state is to be maintained. In spite of the application of the first signal level during this period, the contracted or partially contracted first fluid tends to flow back to form a layer as in the inactive state. The rate of backflow depends amongst others on the properties of the first fluid. The backflow causes an undesirable change in the display state of an element and, consequently, a reduced quality of the image of the display device.

The application of a reset pulse, i.e. the application of the second signal level during the second period, in the display period causes a reset of the display element that counteracts the backflow. The reset pulse is in the form of a second signal level applied during a second period. Since the reset may affect the instantaneous display state of an element, the second period should not be too long compared to the preceding and succeeding periods in which the first signal level is applied, otherwise the reset become visible in the image produced by the display device. In order not to affect the display too much, the perceived display state should be maintained substantially during the reset pulse. When the sum of the preceding and succeeding periods is longer than five times the second period, the visibility of the resets is reduced for an observer of the image without affecting the counteraction of the backflow. More preferably the first period is longer than 2 ms and/or the sum of the preceding and succeeding periods is longer than 7 times the second period.

At the start of a display period a first signal level is applied to achieve a desired display state. After the display period a subsequent display period starts and a further first signal level is applied that is different or equal to the first signal level, depending on whether or not a change in display state is desired. It should be noted that the so-called pre-pulses known from the prior art are to be applied only at the start of a display period to remove the memory of a previous, different display state. In contrast, reset pulses are applied during the display period, i.e. during the time a desired display state is to be maintained, to counter effects occurring during the display period. The reset pulses according to the invention may be combined with preset pulses by applying a preset pulse at the start of a display period and applying one or more reset pulses during the display period.

The start of the first period is defined by a change in the first signal level, the end of a reset pulse or the end of a preset pulse.

The object of the invention is also achieved by a method of driving an electrowetting display device including a display element, the display element having an electrode for applying a voltage and providing a display state in response to a signal level of the voltage, the method comprising the following subsequent steps for maintaining a display state of the display element:
applying a first signal level during a first period for providing the display state;
applying a second signal level different from the first signal level during a second period while substantially maintaining a perceived display state of the first period; and
applying the first signal level during a third period;
an instantaneous display state during the second period being different from an instantaneous display state prior to application of the second signal level. The features of this embodiment of the method may be applied independently of or in combination with the features of the previous embodiment of the method. The first period is advantageously longer than 1 ms.

The display state is usually expressed in terms of transmittance for a transmissive display device and in terms of reflectance for a reflective display device. The display state of a display element is measured by integrating the transmittance or reflectance over the cross-section of the display element. The difference in instantaneous display state is preferably measured as a change between a measurement of the instantaneous display state immediately prior to the application of the reset pulse and a measurement at the end of the reset pulse. When expressed as a percentage, the difference is the change in instantaneous display state divided by the value of the instantaneous display state immediately prior to the application of the reset pulse. It should be noted that the instantaneous display state is a display state measured with a detector having a response time substantially shorter than the reset pulse duration, whereas the perceived display state is a display state integrated over the response time of the eye of a human observer.

It has been observed that the application of a reset pulse that does not significantly change the instantaneous display state during the reset pulse is not effective in counteracting the backflow. When the instantaneous display state changes by 5% or more during the reset pulse a noticeable counteracting effect is observed. A good counteracting of the backflow has been measured when the difference is larger than 30%. When the difference is larger than 60% a superior suppression of the backflow is achieved. In terms of response time of the display element, the second period is preferably longer than 0.11 of the response time and more preferably longer than 0.28 times the response time. When the difference is smaller than 90%, the perceived display state during the display period can be maintained sufficiently, i.e. the visibility of the reset in the image can be reduced sufficiently.

The visibility of the resets is reduced when the duration $t_1$ of the first period complies with $1/t_1 > 50$ d for d>40% and $1/t1>0$ for d<40%, where $t_1$ is measured in seconds and d is the difference in display state measured as a percentage. In a special embodiment $1/t_1 > 50$ d for d>0.

In a special embodiment of the method the first period is related to a relaxation time $t_{rel}$ of the display element. period. The relaxation time is the time in which a instantaneous display state changes by 10% when the voltage for providing the display state remains applied to the display element. For example, in a transmissive display, a certain voltage causes the transmission of a display element to achieve a display state of 80% of the maximum transmission of the element. The relaxation time is the time from the application of the voltage till the moment the transmission has reduced to 72% of the maximum transmission. The relaxation time can be measured by observing the time evolution of the instantaneous display state of a display element during the application of the voltage.

When the first period is shorter than three times the relaxation time, the visibility of the reset pulses in the perceived display state is strongly reduced. For high-quality display devices the first period should be shorter than the relaxation time to reduce the visibility of the reset pulses even further and improve the contrast of the display device. More advantageously, the first period is at least five times shorter than the relaxation time.

In a further embodiment of the method the first period having a duration of $t_1$ and the second period having a duration of $t_2$ comply with $1/t_1 > \alpha t_2/t_r + \beta$ for $t_2/t_r > -\beta/\alpha$ and $1/t_1 > 0$ for $t_2/t_r \leq -\beta/\alpha$, $t_r$ being a response time of the element and a and being constants equal to 62 s$^{-1}$ and −38 s$^{-1}$ when $t_1 < t_{rel}$ and equal to 68 s$^{-1}$ and −38 s$^{-1}$ when $t_1 \sim t_{rel}$. All durations and response times are measured in seconds.

The repetition frequency of the reset pulses, $1/t_1$, must be higher than a certain minimum frequency, determined by the response time $t_r$. The response time is the time required to reach 90% of the final state, starting from the inactive state. For many embodiments of the display device this response time is approximately equal to the response time from the active state to the inactive state. The case $t_1 \sim t_{rel}$ refers to strong back flow, where the ~ means $t_1 > 0.7$ $t_{rel}$. When $t_1$ complies with the above condition, the display will be substantially free from flicker for an observer, even when observing at a distance of 20 cm from the display device.

For small display elements, i.e. typically smaller than 2 mm by 5 mm, the condition is $1/t_1 > \alpha t_2/t_r + \beta$ for $t_2/t_r > -1.4\beta/\alpha$ and $1/t_1 > 0$ for $t_2/t_r \leq -1.4\beta/\alpha$, $t_r$ being a response time of the element and α and β being constants equal to 90 s$^{-1}$ and −40 s$^{-1}$ when $t_1 < t_{rel}$ and equal to 100 s$^{-1}$ and −40 s$^{-1}$ when $t_1 \sim t_{rel}$.

Since the application of reset pulses requires energy, the first period is preferably longer than 10 ms; this reduces energy consumption when combined with an increase of the duration of the display state. Shorter periods than 10 ms do not appreciably reduce flicker any further.

In a further embodiment the method includes carrying out the last two of said subsequent steps again at the end of the third period. In this method several reset pulses are applied during one display period. This can be useful for long display periods and for first fluids having a strong backflow. It is also possible to have fewer reset pulses than display periods.

In further embodiment of the method the display element attains a first extreme display state at a low signal level and a second extreme display state at a high signal level, the magnitude of the second voltage being less than ⅓ of the high signal level. When the high signal level is 15 V, the low signal level is between −5 V and +5 V.

In a special embodiment the second signal level is associated with an extreme state of the element, either the first extreme display state or inactive state or the second extreme display state or open state. When the second signal level is the inactive state, the reset pulse will force the first fluid from the active state to the inactive state. At the end of the reset pulse the first fluid will be in a less contracted state than in the active state. Immediately after the reset pulse the first signal level is applied again to the element, and the first fluid will retract again to its active state.

When the first period and the third period are each longer than 5 times the duration of the second period, the change in the observed display state caused by the resets is further improved. High-quality displays may require a factor of 10 times. Even when the resets are not visible to an observer as display flicker, the resets may still change the observed gray value of an element. The above choice of periods reduces the effect of the resets on the observed gray value.

The method according to the invention is very suitable for driving a transmissive, reflective or transflective display device.

Another aspect of the invention relates to a display driving system for an electrowetting display device having a display element including an electrode, the display driving system including a data input for receiving data signals, each data signal selecting a display element and providing a display state for the display element, an output of the display driving system being connected to the electrode for applying a voltage having the signal level pertaining to the display state, the display driving system being arranged to perform the method of any according to the invention.

In a special embodiment the display driving system includes a signal distributor having an input connected to the data input and a plurality of distributor outputs; and a driver assembly including a one or more driver stages, each driver stage having an input connected to one of the distributor outputs.

In another special embodiment the display driving system includes a micro controller unit and/or logic, in addition to the distributor and the driver assembly.

In a so-called direct drive embodiment, the display driving system includes a signal distributor having an input connected to the data input and a plurality of distributor outputs; a driver assembly including one or more driver stages, each driver stage having an input connected to one of the distributor outputs.

An output of each driver may be connected to at least one electrode of the display element. For a display device including a plurality of elements arranged in columns and/or rows, each driver stage has a driver stage output connected to a column electrode or a row electrode. This embodiment is suitable for a so-called active matrix display device.

The display driving system may include a generator for forming pulses having a voltage of the second signal level and a duration of the second interval and having an output.

The display driving system may be adapted for driving a transmissive, reflective or transflective display device. The adaptation may involve modification of the voltages applied to the display elements to achieve a desired display state.

A third aspect of the invention relates to an electro-optic display apparatus including a display driving system according to the invention and a display device.

Further features and advantages of the invention will become apparent from the following description of preferred embodiments of the invention, given by way of example only, which is made with reference to the accompanying drawings.

DETAILED DESCRIPTION OF THE INVENTION

Figure 1:
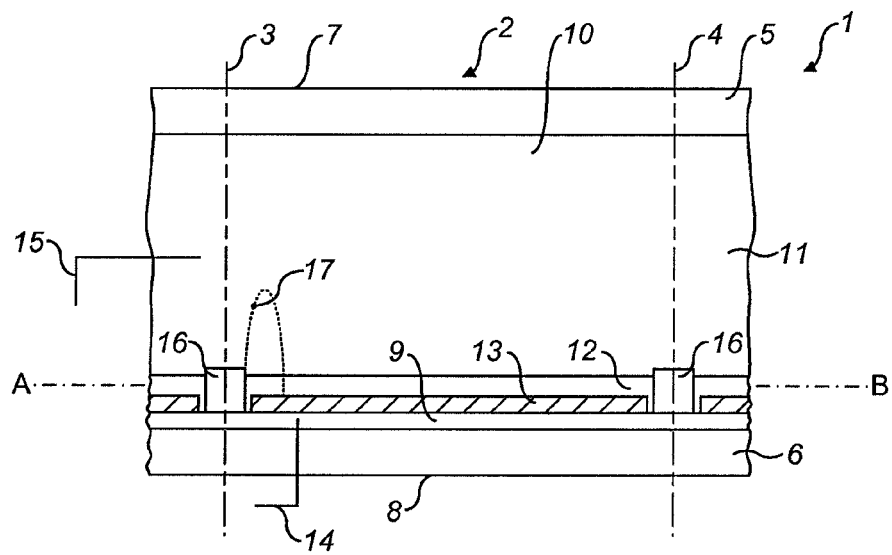
FIG. 1 shows a diagrammatic cross-section of a part of an embodiment of an electrowetting display device.

FIG. 1 shows a diagrammatic cross-section of an embodiment of an electrowetting display device 1. The display device includes a plurality of electrowetting elements 2, one of which is shown in the Figure. The lateral extent of the element is indicated in the Figure by the two dashed lines 3, 4. The electrowetting elements comprise a first support plate 5 and a second support plate 6. The support plates may be separate parts of each electrowetting element, but the support plates are preferably shared in common by the plurality of electrowetting elements. The support plates may be made for instance of glass or polymer and may be rigid or flexible.

The display device has a viewing side 7 on which an image or display formed by the display device can be viewed and a rear side 8. The first support plate 5 faces the viewing side; the second support plate 6 faces the rear side 8. In an alternative embodiment the display may be viewed from the rear side 8. The display device may be of the reflective, transmissive or transflective type. The display may be a segmented display type in which the image is built up of segments. The segments can be switched simultaneously or separately. Each segment includes one electrowetting element 2 or a number of electrowetting elements 2 that may be neighbouring or distant. The electrowetting elements included in one segment are switched simultaneously. The display device may also be an active matrix driven display type or a passive matrix driven display.

A space 10 between the support plates is filled with two fluids: a first fluid 12 and a second fluid 11. The second fluid is immiscible with the first fluid. The second fluid is electrically conductive or polar, and may be water or a salt solution such as a solution of potassium chloride in a mixture of water and ethyl alcohol. The second fluid is preferably transparent, but may be coloured, white, absorbing or reflecting. The first fluid is electrically non-conductive and may for instance be an alkane like hexadecane or (silicone) oil. A hydrophobic layer 13 is arranged on the support plate 6, creating an electrowetting surface area facing the space 10. The layer may be an uninterrupted layer extending over a plurality of electrowetting elements 2 or it may be an interrupted layer, each part extending only over one electrowetting element 2, as shown in the Figure. The layer may be for instance an amorphous fluoropolymer layer such as AF1600 or an other low surface energy polymer. The hydrophobic character causes the first fluid to adhere preferentially to the support plate 6 since the first fluid has a higher wettability with respect to the surface of the hydrophobic layer 13 than it has with respect to the second fluid. Wettability relates to the relative affinity of a fluid for the surface of a solid. Wettability increases with increasing affinity, and it can be measured by the contact angle formed between the fluid and the solid and measured internal to the fluid of interest. This increases from relative non-wettability at an angle more than 90° to complete wettability when the contact angle is 0°, in which case the fluid tends to form a film on the surface of the solid.

Each element 2 includes an electrode 9 arranged on the second support plate 6. The electrode 9 is separated from the fluids by an insulator, which may be the hydrophobic layer 13. In general, the electrode 9 can be of any desired shape or form. The electrode 9 is supplied with voltage signals by a signal line 14. A second signal line 15 is connected to an electrode which is in contact with the conductive second fluid 11. This electrode is common to all elements, since they are fluidly interconnected by and share the second fluid, uninterrupted by walls. The electrowetting elements 2 are controlled by a voltage $V_e$ applied between the signal lines 14 and 15. The electrodes 9 on the support plate 6 each are connected to a display driving system by a matrix of printed wiring on the support plate.

In a display of the segment type, the electrode 9 may extend over several elements and define an image region of a plurality of electrowetting elements, which will all be switched simultaneously. When a segment covers several electrowetting elements, the signal line 14 is a common signal line for these electrowetting elements.

The lateral extent of the first fluid 12 is constrained to one electrowetting element by walls 16 that follow the cross-section of the electrowetting element in the plane A-B. In the embodiment shown in FIG. 1 the walls define the extent of the hydrophobic layer 13. When the hydrophobic layer extends over a plurality of elements, the walls are preferably arranged on top of the layer. Further details of the electrowetting elements of the display are disclosed amongst others in international patent application WO 03071346.

The first fluid absorbs at least a part of the optical spectrum. The fluid may be transmissive for a part of the optical spectrum, forming a colour filter. For this purpose the fluid may be coloured by addition of pigment particles or dye. Alternatively, the first fluid may be black, i.e. absorb substantially all parts of the optical spectrum, or reflecting. The hydrophobic layer may be transparent or reflective. A reflective layer may reflect the entire visible spectrum, making the layer appear white, or part of it, making it have a colour.

When the voltage $V_e$ applied between the signal lines 14 and 15 is set at a non-zero active signal level $V_a$, the element will enter into an active state. Electrostatic forces will move the second fluid 11 towards the segment electrode 9, thereby repelling the first fluid 12 from the area of the hydrophobic layer 13 to the walls 16 surrounding the area of the hydrophobic layer, to a drop-like form as schematically indicated by a dashed line 17. This action uncovers the first fluid from the surface of the hydrophobic layer 13 of the electrowetting element. When the voltage across the element is returned to an in-active signal level of zero or a value near to zero, the element will return to an inactive state, where the first fluid flows back to cover the hydrophobic layer 13. In this way the first fluid forms an electrically controllable optical switch in each electrowetting element.

Figure 2:
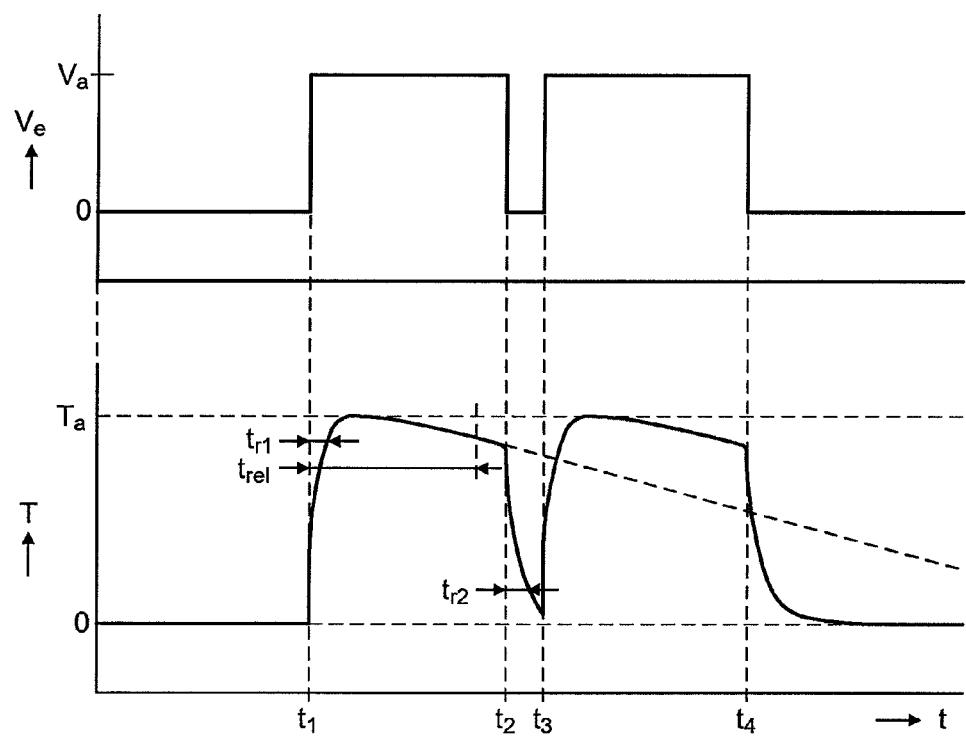
FIG. 2 shows a graph of the effect of a reset pulse on the transmission of an electrowetting element.

FIG. 2 shows a graph of the effect of a reset pulse on the transmission of an electrowetting element. The top trace shows the voltage $V_e$ applied between the electrodes 14 and 15 as a function of time t. Although Va is shown as a positive voltage, it may also be a negative voltage. The bottom trace shows the transmission of the element 2 as response to the applied voltage. The transmission is measured as the transmittance integrated over the cross-section of the element. The Figure shows three display periods, a first display period terminating at time $t_1$, a second display period from time $t_1$ to time $t_4$ and a third display period starting at time $t_4$. The traces in the Figure are shown for an element having a transparent second fluid and an opaque first fluid. Such an element is suitable for a transmissive display device. The traces for elements suitable for a reflective display device are similar, but instead of the transmittance the reflectance is measured. Also, the traces of the transmittance or reflectance of a transflective display are similar.

In the first display period in the example of the Figure the applied voltage is zero and the display element is in an inactive state, i.e. the transmission is zero. In the second display period the applied voltage is set at a first signal level $V_a$, which sets the display element in an active state. The first fluid in the element contracts and the transmission of the element increases from zero to an active transmission level $T_a$. A response time $t_{r1}$ of the element is indicated in the Figure and is defined as the time required to reach 90% of the final state, starting from the inactive state. In the Figure the final state is the transmission level $T_a$.

During the application of voltage $V_a$, the first fluid will gradually flow back, thereby reducing the transmission of the element. A relaxation time $T_{rel}$ of the element is shown in the Figure and is defined as the time required for the element to recede to 90% of the final state, starting from a transition from the inactive to the active state.

After the first signal level $V_a$ has been applied for a first period from $t_1$ to $t_2$, a reset pulse is given during a second period, from time $t_2$ to $t_3$, by applying a voltage of a second signal level, which is zero volt in this example. The first fluid tends to return to the state in which it forms the layer 12. A response time $t_{r2}$ is drawn in the Figure and is defined as the time required to reach 10% of the state at the start of the reset pulse. In the present example this is 10% of the transmission of the element at the start of the reset pulse. In many embodiments of the electrowetting element the second period is too short for the first fluid to flow back completely. The difference in instantaneous display state at the start and end of the reset pulse is 90% in the example of the Figure.

At time $t_3$ the voltage is switched back to the first signal level $V_a$. The first fluid will contract and the transmission will increase to the level of $T_a$. Subsequently, the backflow will cause a gradual reduction of the transmission.

After the first signal level has been applied for a third period from $t_3$ to $t_4$, the second display period ends at time $t_4$. At $t_4$ the voltage is set to zero for the third display period and the first fluid returns to form a layer and reduce the transmission to zero.

The application of a reset pulse during the second display period counteracts the effect of backflow. Without the reset pulse the transmission of the element would have followed the slanting dashed line in the Figure. Although the effect of the reset pulse has been explained with reference to an electrowetting element operating in transmission, a similar explanation can be given for an electrowetting element operating in reflection, whereby the display state of the element is not represented by a transmission but by a reflection.

In a particular embodiment, the duration of a display period is 20 ms and the first period is 10 ms, the second period, during which the reset pulse is applied, is 1 ms and the third period is 9 ms. The first response time $t_{r1}$ is 4 ms, the second response time $t_{r2}$ is also 4 ms and the relaxation time $t_{rel}$ is 200 ms. The reset pulse reduces the effect of backflow to such an extent that an observer will not perceive the effect. The reset pulses are sufficiently short not to produce flicker for an observer of the image of the display.

In another embodiment for driving a segmented display the duration of a display period is 60 ms, the first period is 29 ms, the second period is 2 ms and the third period is also 29 ms and the difference in instantaneous display state is 50%.

The response times $t_{r1}$ and $t_{r2}$ and the relaxation time $t_{rel}$ of an element of a display device can be determined from a trace similar to the bottom trace of FIG. 2 by switching the element between the inactive state and the open state. The second response time $t_{r2}$ can be determined from the transition from the open state to the inactive state. Since the mechanism between the opening and closing of the element involves different forces, the two response times need not be the equal. When they are different, the average value of $t_{r1}$ and $t_{r2}$ should be used for the value of $t_r$ in the condition for the repetition frequency $1/t_1$.

The embodiment of the method shown in FIG. 2 applies one reset pulse during a display period. Two or more reset pulses may be applied during one display period, for example for elements that have a relaxation time that is substantially shorter than the duration of the display period.

Since the energy required to apply reset pulses depends more on the number of pulses than on the duration of the pulses, the number of reset pulses applied to an element is preferably reduced to a minimum number if energy consumption of a display apparatus should by restricted. As a lower boundary, one reset pulse is preferably given during each display period where an non-zero voltage is applied.

The visibility of reset pulses that are synchronous with the display periods is lower than that of reset pulses that are fully asynchronous. Therefore the duration of the first and third periods is preferably the same for all display periods.

Figure 3:
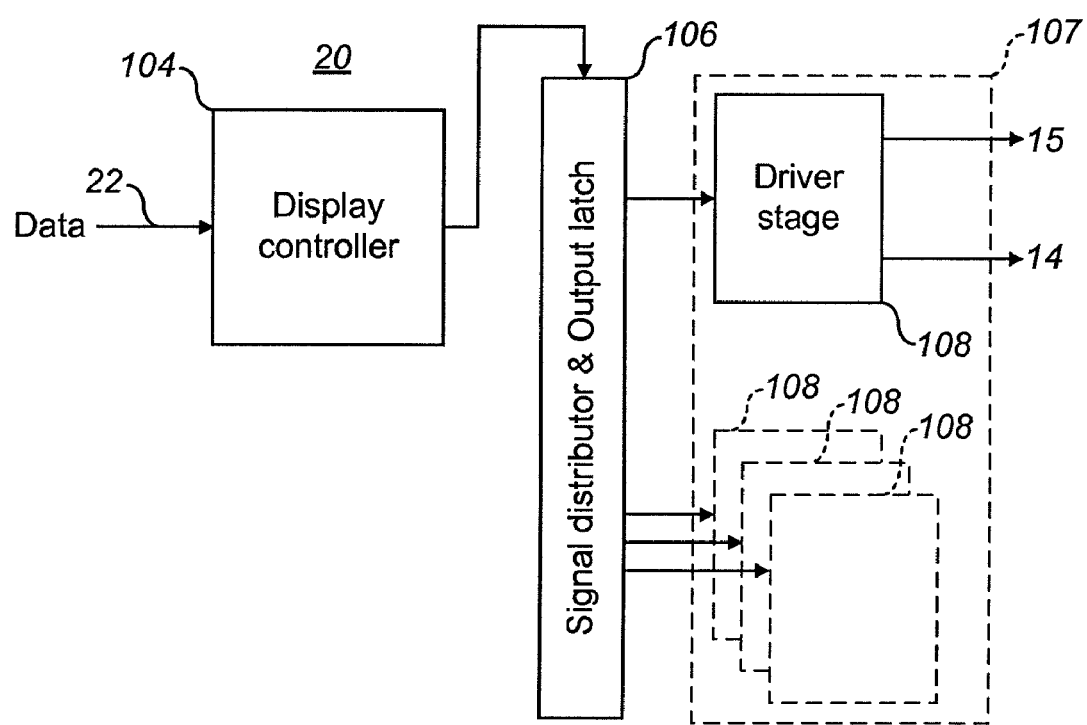
FIG. 3 shows a first embodiment of a display driving system.

FIG. 3 shows a diagrammatic view of an embodiment of an electrowetting display driving system according to the invention. The display driving system is of the so-called direct drive type and may be in the form of an integrated circuit preferably adhered to the support plate 6. The display driving system 20 includes control logic and switching logic, and is connected to the display by means of signal lines 14 and a common signal line 15. Each electrode signal line 14 connects an output from the display driving system 20 to a different electrode 9, respectively. The common signal line is connected to the second, conductive fluid 11 through an electrode. Also included are one or more input data lines 22, whereby the display driving system can be instructed with data so as to determine which elements should be in a active state and which elements should be in a non-active state at any moment of time.

By selectively actuating certain of the electrodes 9 with an active voltage signal, the corresponding electrowetting elements are driven to an open state, in which the first fluid 12 is at least partly removed from the surface of the support plate 6, whilst other non-selected electrodes are driven with a non-active voltage signal which is equal to, or at least substantially equal to, a common voltage signal applied to the common signal line 15.

The embodiment of the controller shown comprises a display controller, 104, e.g. a microcontroller, receiving input data from the input data lines 22 relating to the image to be displayed. The microcontroller operates as a generator for reset pulses synchronous with the input data and it integrates the input data and the reset pulses in one stream of data. The output of the microcontroller is connected to the data input of a signal distributor and data output latch 106. The signal distributor distributes incoming data over a plurality of outputs connected to the display device, preferably via drivers. The signal distributor causes data input indicating that a certain element is to be set in a specific display state to be sent to the output connected to this element. The distributor may be a shift register. The input data is clocked into the shift register and at receipt of a latch pulse the content of the shift register is copied to the output latch. The output latch has a one or more outputs, connected to a driver assembly 107. The outputs of the latch are connected to the inputs of one or more driver stages 108 within the driving system. The outputs of each driver stage are connected through the signal lines 14 and 15 to a corresponding display element.

In response to the input data a driver stage will output a voltage of the first signal level to set one of the elements in a first display state. During this display state the reset pulse changes the voltage applied to the element to the second signal level and, after the reset pulse, the voltage returns to the first signal level. The durations of the periods correspond to the method according to the invention.

The reset pulses are applied intermittently, preferably at a regular interval. For example, the reset pulses may consist of a pulse every 25, 35 or 45 milliseconds, and have a duration of less than 10 milliseconds. In two different embodiments the reset pulse has a duration of 1 and 2 millisecond, causing a difference in instantaneous display state of 40% and 65% respectively.

It should be noted that the reset pulses are applied only in the case of the electrowetting elements which are selected to be in an active state, namely those electrowetting elements which are currently open and being driven by an active voltage. The remaining drivers, which are in an off state and provide a non-active voltage, are unaffected by the reset pulse, as they do not require resetting.

Figure 4:
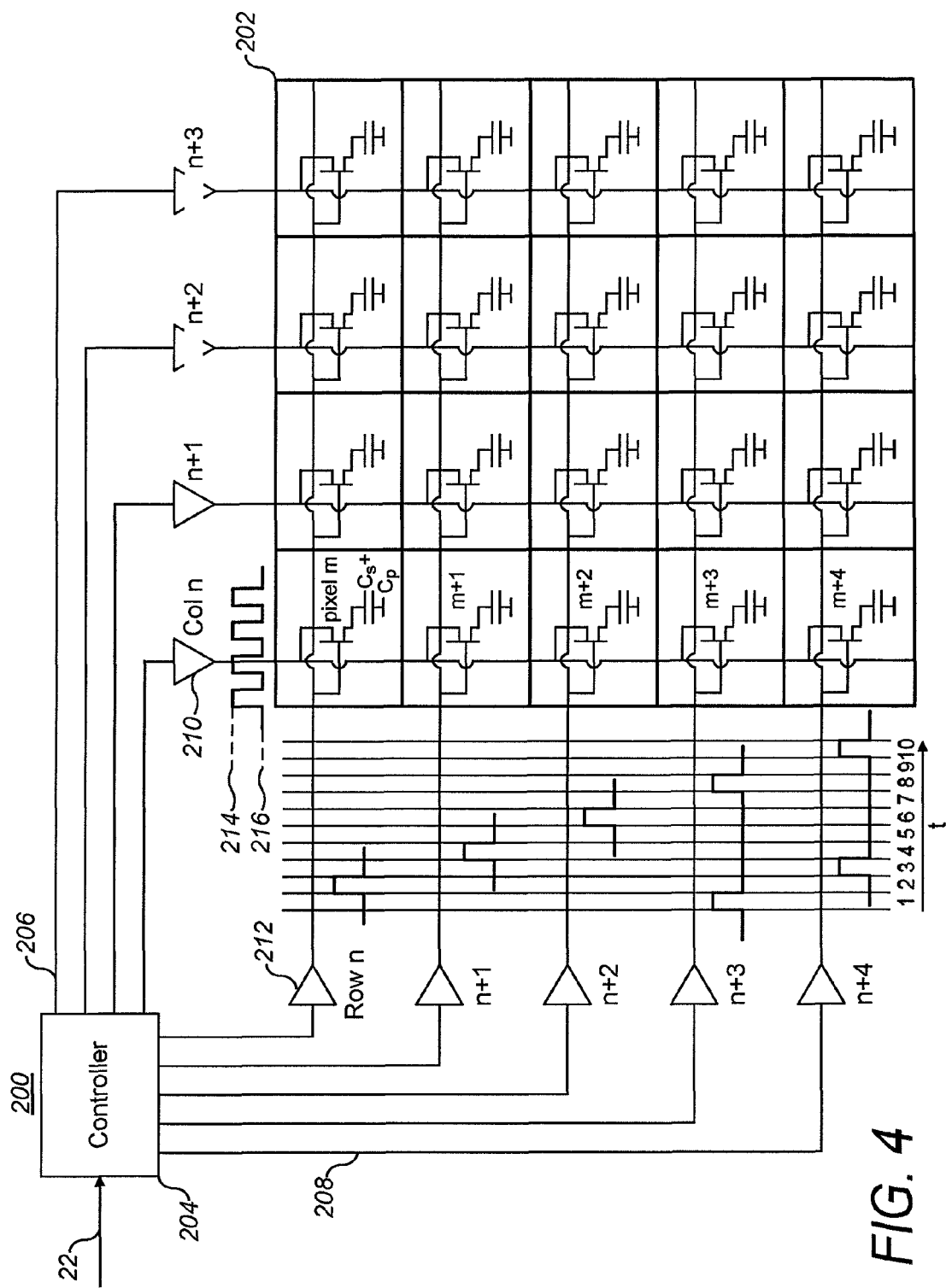
FIG. 4 shows a second embodiment of a display driving system.

FIG. 4 shows a diagrammatic view of another embodiment of an electrowetting display driving system 200 according to the invention for controlling the image of an active matrix display device 202. The display elements of the display device are arranged in the form of a matrix having a plurality of columns and a plurality of rows. The Figure shows four columns labelled n to n+3 and five rows labelled n to n+4.

The display driving system 200 is of the so-called active matrix type and may be in the form of an integrated circuit preferably adhered to the support plate 6. The controller shown comprises a microcontroller 204 including control logic and switching logic. It receives input data from the input data lines 22 relating to the image to be displayed. The microcontroller generates the reset pulses and interleaves them with the input data. The microcontroller has an output for each column of the display device, providing a column signal. A column signal line 206 connects each output to a column of the display device. The microcontroller also has an output for each row of the display device, providing a row selection signal. A row signal line 208 connects each output to a row of the display device. A column driver 210 and a row driver 212 is arranged in each column and row signal line, respectively. The Figure shows the signals lines only for those columns and rows shown in the Figure. The row drivers may be integrated in a single integrated circuit. Similarly, the column drivers may be integrated in a single integrated circuit. The integrated circuit may include the complete driver assembly. The integrated circuit may be integrated on the support plate 6 of the display device. The integrated circuit may include the entire display driving system.

Each element of the display device 202 includes an active element in the form a transistor. The electrodes of the element are indicated as a capacitor $C_p$. The line connecting the capacitor to ground is the common signal line 15 and the line connecting the capacitor to the transistor is the signal line 14 shown in FIG. 1. The element may include an optional capacitor $C_s$ for storage purposes. This capacitor is arranged in parallel with $C_p$ and is not separately shown in FIG. 4. The column drivers provide the signal levels corresponding to the input data and the reset pulses for the elements. The row drivers provide the signals for selecting the row of which the elements are to be set. A sequence of voltages of one of the column drivers 210 is shown in the Figure. The signal level 214 indicates the second signal level corresponding to a reset pulse; the signal level 216 indicates the first signal level corresponding to input data. When the transistor of an element receives a row selection signal, it passes the signal level of its column driver to the electrodes of the cell. After the transistor has been switched off, the voltage over the cell will substantially be maintained until the transistor is opened again by the next row selection signal for the element.

The display driving system 204 controls the display states of the elements in a cycle including four adjacent rows. The following table shows the sequence of row selection signals for a series of rows and the signal levels of the column driver for column n. FIG. 4 shows the row selection pulses on a lattice of vertical lines representing ten subsequent periods, numbered 1 to 10. Each period has a duration of 125 microseconds. In period 1 row n+3 receives a row selection signal and the column driver for column n outputs a second signal level corresponding to a reset pulse. Display element m+3 will now receive a reset pulse. This step of the control sequence is shown in the first row of Table 1.

TABLE 1

Control sequence of active matrix display device

| t | Row | column |
|---|---|---|
| 1 | n + 3 | reset |
| 2 | n | data |
| 3 | n + 4 | reset |
| 4 | n + 1 | data |
| 5 | n + 5 | reset |
| 6 | n + 2 | data |
| 7 | n + 6 | reset |
| 8 | n + 3 | data |
| 9 | n + 7 | reset |
| 10 | n + 4 | data |
| ... | ... | ... |

Display element m+3 will receive a data signal level in period 8. Hence, the reset voltage level was applied to display element m+3 from period 1 to 8, i.e. 7 times 125 microseconds, being 0.875 millisecond. The duration of the period during which the data signal is applied before and after the reset pulse is 73 periods, i.e. 9.125 ms. In other words, the duration of the first, second and third period in this embodiment have values of 9.125, 0.875 and 9.125 ms.

In an alternative embodiment the display driving system controls the display device in a cycle including ten adjacent rows. The subsequent periods have a duration of 50 microseconds, resulting in a reset pulse duration of 1 millisecond. The periods preceding and succeeding the reset pulse in which the electrodes are at a first signal level have a duration of 29 and 30 milliseconds, corresponding to a display period of 60 milliseconds.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of driving an electrowetting display device including a display element, the display element having an electrode for applying a voltage and providing a display state in response to a signal level of the voltage, the method comprising the following subsequent steps for maintaining a display state of the display element:
applying a first signal level during a first period for providing the display state;
applying a second signal level different from the first signal level during a second period while substantially maintaining a perceived display state of the first period; and
applying the first signal level during a third period;
the first period being longer than 1 ms and the sum of the first period and the third period being longer than five times the second period.

2. A method of driving an electrowetting display device including a display element, the display element having an electrode for applying a voltage and providing a display state in response to a signal level of the voltage, the method comprising the following subsequent steps for maintaining a display state of the display element:
applying a first signal level during a first period for providing the display state;
applying a second signal level different from the first signal level during a second period while substantially maintaining a perceived display state of the first period; and
applying the first signal level during a third period;
a display state during the second period being different from a display state prior to application of the second signal level.

3. A method according to claim 1 or 2, wherein the first period is shorter than three times a relaxation time $t_{rel}$ of the display element.

4. A method according to claim 3, wherein the first period having a duration of $t_1$ and the second period having a duration of $t_2$ comply with $$1/t_1 > \alpha t_2/t_r + \beta \text{ for } t_2/t_r > -\beta/\alpha \text{ and}$$

$$1/t_1 > 0 \text{ for } t_2/t_r \leq -\beta/\alpha,$$

$t_r$ being a response time of the element and $\alpha$ and $\beta$ being constants equal to 62 s$^{-1}$ and −38 s$^{-1}$ when $t_1 < t_{rel}$ and equal to 68 s$^{-1}$ and −38 s$^{-1}$ when $t_1 \sim t_{rel}$.

5. A method according to claim 3, wherein the first period having a duration of $t_1$ and the second period having a duration of $t_2$ comply with $$1/t_1 > \alpha t_2/t_r + \beta \text{ for } t_2/t_r > -1.4 \beta/\alpha \text{ and}$$

$$1/t_1 > 0 \text{ for } t_2/t_r \leq -1.4\beta/\alpha,$$

$t_r$ being a response time of the element and $\alpha$ and $\beta$ being constants equal to 90 s$^{-1}$ and −40 s$^{-1}$ when $t_1 < t_{rel}$ and equal to 100 s$^{-1}$ and −40 s$^{-1}$ when $t_1 \sim t_{rel}$.

6. A method according to claim 3, wherein the first period is longer than 10 ms.

7. A method according to claim 1 or 2, including carrying out the last two of said subsequent steps at the end of the third period.

8. A method according to claim 1 or 2, wherein the display element attains a first extreme display state at a low signal level and a second extreme display state at a high signal level, the magnitude of the second voltage being less than ⅕ of the high signal level.

9. A method according to claim 1 or 2, wherein the first period and the third period are longer than 10 times the duration of the second period.

10. A display driving system for an electrowetting display device having a display element including an electrode, the display driving system including a data input for receiving data signals, each data signal selecting a display element and providing a display state for the display element, an output of the display driving system being connected to the electrode for applying a voltage having the signal level pertaining to the display state, the display driving system being arranged to perform the method of claims 1 or 2.

11. A display driving system according to claim 10, including a signal distributor having an input connected to the data input and a plurality of distributor outputs; and
a driver assembly including one or more driver stages, each driver stage having an input connected to one of the distributor outputs.

12. A display driving system according to claim 11, wherein each driver stage has a driver stage output connected to at least one electrode of the display element.

13. A display driving system according to claim 11, wherein the display device includes a plurality of elements arranged in columns and/or rows and each driver stage has a driver stage output connected to a column electrode or a row electrode.

14. A display driving system according to claim 10, including a generator for forming pulses having a voltage of the second signal level and a duration of the second interval and having an output connected to the data input or to a driver assembly.

15. A display driving system according to claim 10 adapted for driving a transmissive, reflective or transflective display device.

16. An electro-optic display apparatus including a display driving system according to claim 10 and a display device.

* * * * *